United States Patent Office 3,174,866
Patented Mar. 23, 1965

3,174,866
PREPARING HYPOALLERGENIC MILK PROTEIN COMPOSITION
Sidney Saperstein, Bartlett, Ill., assignor to The Borden Company, New York, N.Y., a corporation of New Jersey
No Drawing. Filed Jan. 26, 1962, Ser. No. 169,091
4 Claims. (Cl. 99—54)

This invention relates to a hypoallergenic product and particularly to beta-lactoglobulin and other milk protein allergens modified in manner to decrease substantially or eliminate entirely their allergenic properties. The invention is particularly useful in making a hypoallergenic milk product and will be illustrated first by description in connection therewith.

The fact that the milk proteins beta-lactoglobulin, alpha-lactalbumin, and serum albumin are allergens for many persons is well known. It has been proposed that this property be reduced by heating milk for a few minutes or so. I have found such processing ineffective or undependable in correcting the milk for many sensitive people.

Briefly stated, my invention comprises the herein described process and product of heating an aqueous dispersion of the said proteins in contact with casein until the beta-lactoglobulin becomes so complexed, i.e., associated by chemical combination or otherwise, with the casein that 90%–99% or more of the beta-lactoglobulin will precipitate along with casein in the acidity of human gastric juice, as at a pH of about 4.5. When the beta-lactoglobulin has been so complexed, or modified, the others of the said protein allergens, which are less difficult to correct, will also have been satisfactorily reduced in allergenic properties. The process of the invention includes maintaining the casein and beta-lactoglobulin at temperatures below that temperature which, if used for a long time, would cause release of the beta-lactoglobulin and its reactivation as an allergen.

As to materials, the beta-lactoglobulin, other proteins to be modified and the casein are suitably those of milk. In any case they are substantially fat free and in aqueous dispersions as heated. Examples are skim milk and a reconstituted milk resulting from dispersion of skim milk solids in powder form in water to a solids concentration about that of fresh skim milk or higher up to about 15%. If it is attempted to use homogenized whole milk, the fat causes the effect to be unsatisfactory; the cause is considered to be the interference of the fat with the proper and necessary contact or action of the allergenic proteins with the casein during the heating step.

The proportions of casein to beta-lactoglobulin that occurs in cows milk is suitable and the one that I ordinarily use. The proportion may be varied, however, as for instance from about 25 up to 150 parts of casein for 1 part of the beta-lactoglobulin. With low amounts of casein, the proportion of the beta-lactoglobulin that precipitates at the isoelectric point for casein is reduced. Casein in amount above the maximum stated is unnecessary and introduces a taste variation that is objectionable for some food uses.

The pH during the heating, to correct the allergenic properties, is above that at which even slight curdling of the milk occurs and below that which if used would cause marked browning of the milk during the heating thereof at the temperature and for the long time used. The pH of the milk to be heated is within the range about 6.2–6.8 and usually 6.4–6.7. The pH drops slightly during the long extended heating as, for instance, by about 0.2–0.3 on the pH scale.

The time during which and the temperature at which the milk is subjected to heating to decrease the allergenic properties is critical as to the effect. The heating is continued until at least about 90% of the beta-lactoglobulin becomes precipitable with the casein at a pH of 4.5. This requires at least approximately 2.5 hours and ordinarily not more than 5. Shorter periods of heating are not effective in making the beta-lactoglobulin precipitatable with the casein at pH 4.5. Numerous tests have shown also that such precipitability is required for the desired inactivation step, that is, reduction of allergenic effect of the product when consumed orally. The temperature is within the range about 190°–212° F. and for best results 202°–208° F.

Restriction of contact of the milk with oxygen during the inactivation heating improves the result. Introduction of air or other form of elemental oxygen is avoided, as by not introducing oxygen purposely and not whipping in air by overly vigorous stirring.

The invention will be further illustrated by description in connection with the following examples, proportions here and elsewhere herein being expressed as parts by weight unless specifically stated to the contrary.

Example 1

Pasteurized skim milk was heated in glass on a hot plate with constant but slow agitation at a temperature maintained within the range 202°–208° F. for a total of 3 hours. Samples were taken at intervals. Each sample was divided into two parts. One part of each was autoclaved for 15 minutes at 247° F. in a glass container set in a closed retort, this heating simulating terminal sterilization that might be given to the product before actual use in the hospital or the home or during or after canning for marketing.

For test purposes, all samples were diluted with distilled water to a protein content of 1.5% (N x 6.25). The samples were then acidified to a pH of 4.4–4.6 by admixture of hydrochloric acid. The casein and other materials thus precipitated were removed by centrifuging and the clear centrifugate was mixed with dilute sodium hydroxide solution in amount to raise the pH to within the range 6.7–7.1. The additional insolubles so precipitated were again removed by centrifuging.

The separated whey, when tested by the addition of trichloroacetic acid, gave a positive test for protein. Other portions of the whey gave significant results in the precipitin test. In this test, two antisera specific for beta-lactoglobulin and alpha-lactalbumin, respectively, are introduced into the whey in test tubes and with a minimum of mixing. The formation or lack of formation of bands of precipitation at the zones of contact of the whey and the antisera in the test tubes is noted. The wheys from all samples which had been heated at 202°–208° F. for 2.5 hours or longer but not autoclaved showed negative for the two proteins in this test. Samples heated less than 2 hours, even without autoclaving, showed positive. Wheys from all the samples which had been both heated at 202°–208° F. and then autoclaved for 15 minutes were positive for beta-lactoglobulin but negative for alpha-lactalbumin. This shows that the autoclaving at 247° F. had released the beta-lactoglobulin.

Example 2

The procedure of Example 1 is followed except that the pasteurized skim milk is replaced by a skim milk powder reconstituted with water in amount to give the same percentage of milk solids in the dispersion as were present in the skim milk.

Example 3

An infant milk formula using milk previously preheated to reduce activity of whey protein allergens was prepared as follows:

Fresh raw fluid skimmed milk was heated in conventional steam jacketed stainless steel kettles at 205°–210° F. for 165 minutes with constant agitation. The milk was then condensed by evaporation under vacuum.

The product in amount to provide skim solids, 444 pounds, was pumped by a positive pump into a jacketed mixing kettle. Sufficient water was added to make the solids concentration of the milk 15%–16%. The milk was then heated to 120° F. and 498 pounds of lactose admixed. Then there were introduced in order and in aqueous solution potassium citrate, 17.37 pounds; sodium citrate, 4 pounds; citric acid, 2.5 pounds. There were then added, in turn, and stirred in an oil mixture that had been warmed to 140° F. and that consisted of 179.66 pounds of palm oil, 89.83 pounds of peanut oil, 89.83 pounds of coconut oil and 5.28 pounds of lecithin; 14.2 million (international) units of Vitamin A, 2.3 million (international) units of vitamin D and 4.896 grams of vitamin E (alpha-tocopherol).

The resulting mixture was warmed to 160° F. and hydrated ferrous sulfate, 194.9 grams, previously dissolved in water, then introduced. Additional nutrients were then added in amount to make the mixture contain a total of 119 grams methionine, 1.96 grams thiamine hydrochloride, 2.94 grams riboflavin, 21.15 grams niacin, 1.96 grams pyridoxine hydrochloride, 11.75 grams calcium pantothenate, 4.9 milligrams vitamin $B_{12}$ and 0.64 gram potassium iodide.

The mixture was then homogenized hot at a temperature of 165° F. and at a total pressure of 2500 p.s.i. with 1000 p.s.i. on the second stage. The mixture was then cooled to 60° F. and passed through a clarifier and a suspension containing 4 pounds of calcium carbonate added to the clarified product. A solution containing 549 grams of ascorbic acid was then added to the mixture. The mixture was adjusted by adding water to a final solids content of 36%–38%.

The solution was passed through a tubular heater or other suitable equipment and heated to 200°–205° F. for 2 minutes. From the heater, the mixture was pumped through a nozzle into a spray box whereby drying was accomplished by conventional spray drying techniques.

*Example 4*

Fresh raw fluid skimmed milk was heated in a conventional steam jacketed stainless steel kettle at 205°–210° F. for 180 minutes with constant agitation. The milk was then condensed by evaporation under vacuum.

The condensed product of total solids concentration approximately 17% was used in amount to provide skim solids, 8.45 lbs. The milk was then heated to 130° F. and 7.68 pounds of lactose admixed. Then there was introduced a mixture of 3.4 pounds palm oil, 1.7 peanut oil, and 1.7 pounds coconut oil previously admixed with 226,000 I.U. of vitamin A palmitate, 37,000 I.U. of D-3 and 1.35 grams D-alpha-tocopherol acetate. To the mixture was then added 2 pounds of lactose previously admixed with 4.53 grams of Sea Kem No. 2, i.e., carrageenin. The temperature was raised to 170° F. and 0.2 pound of glyceryl monostearate (Myverol 18–06) was added.

To this mixture was then added 34.08 grams of calcium carbonate and 33.8 grams of potassium bicarbonate.

There were then introduced, in aqueous solution, thiamin hydrochloride 54 mg., riboflavin 90 mg., niacin 400 mg., pyridoxine hydrochloride 44 mg., D-calcium pantothenate 217 mg., vitamin $B_{12}$ 30 mg., ferrous sulfate hydrated 3.76 grams and potassium iodide 12 mg.

The mixture was then homogenized at a temperature of 165° F. and at a total pressure of 2500 p.s.i. with 500 p.s.i. on the second stage. The mixture was then cooled to 60° F. and 9.1 grams of ascorbic acid, previously dissolved in water, was added. Additional water was added to adjust the solids content to 25 percent.

The product was then pumped through a heated tube of 5/16 inch O.D. and 80 feet long at 300° F., 3½ seconds being required for the product to pass through the tube and about 2 of the 3½ seconds representing holding time at 300° F. to give a sterilization equivalent of $F_0=3$ to 15 and suitably 8. The product temperature was then lowered to 165° F. in a continuing tube and then passed through a homogenizing block in series with the outcoming line. The sterile product was thus homogenized at a pressure of 2500 p.s.i.

The product was then cooled to 95° F. by passage through a cooling coil and then aseptically canned in a Martin aseptic canner.

The present method as illustrated by the examples reduces antigenicity of bovine serum albumin of milk and alpha-lactalbumin, two of the whey proteins which are potential and known allergens, to a level such that they cannot be detected by gross anaphylactic shock in guinea pigs or by the tube precipitin test described.

For the precipitin test here used, the milk is acidified to pH 4.5 with dilute hydrochloric acid or acetic acid and the precipitate that results is removed. The resulting whey is then neutralized by the addition of sodium hydroxide solution and all insoluble material that appears is removed, as by centrifugation. The resulting clear whey is placed in dilution tubes and diluted with 0.87% sodium chloride solution. The highest concentration tested represents a dilution of the original milk protein (N x 6.25) of approximately 1:66. When tested by the conventional tube precipitin methods, using a high titer specific antiserum, no visible precipitin bands are obtained at the said highest concentrations of the proteins, for either bovine serum albumin of milk or for alpha-lactalbumin. The antisera used are capable of detecting the specific proteins within 10 minutes when these proteins are present at a concentration of from 1:10 up to 1:200,000.

When an antiserum of equal potency but of kind specific for beta-lactoglobulin is used in the test, the test becomes positive only after not less than 90 minutes in the 1:66 dilution and is usually negative at all higher dilutions.

Gross anaphylactic shock tests on guinea pigs presensitized to the specific proteins, when such animals are challenged with the neutralized whey made as described above are negative, even with doses as high as 1 ml. administered intravenously whereas control animals give positive responses in such a test to as little as 1 microgram of the specific protein.

Previously available milk products, for which low allergenicity is claimed, give positive precipitin tests and positive anaphylactic shock tests for both alpha-lactalbumin and beta-lactoglobulin.

The products made in the examples by the heating at 202°–208° F. are useful (1) in the aqueous dispersions in which first made, (2) after concentration as to evaporated milk, (3) after spray drying to a milk powder, or (4) after canning as food for infants or others, the techniques of conversion to such concentrated milk, powder or canned goods being conventional except as specifically stated to the contrary herein.

The products made as described as in Example 1 by heating at 202°–208° F., acidification to pH 4.5 and centrifuging, alkalizing to pH 6.9 and centrifuging again, and separating the resulting whey, were given the anaphylactic shock test by injection of the whey into guinea pigs presensitized to the individual antigens referred to above. The whey showed that the antigenic properties had been reduced and, for some animals, completely eliminated.

*Example 5*

The procedure and materials of Example 1 are used except that the components mixed and processed were of kind and in amount to make the final dried powder of the following composition.

| Components: | Weight for approx. 100 lbs. of powder |
|---|---|
| Skim milk solids | lbs. 33.3 |
| Lactose | lbs. 37.3 |
| Palm oil | lbs. 13.5 |
| Peanut oil | lbs. 6.75 |
| Coconut oil | lbs. 6.75 |
| Lecithin | lbs. 0.4 |
| Sodium citrate | lbs. 0.3 |
| Potassium citrate | lbs. 1.3 |
| Citric acid | lbs. 0.19 |
| Methionine | grams 8.9 |
| Vitamin A palmitate, 1 million units/g. | do 1.1 |
| Vitamin $D_3$, 1 million units/g. | do 0.17 |
| D-alpha-tocopherol acetate, 1360 units/g. | do 1.35 |
| Ascorbic acid | do 36 |
| Thiamin hydrochloride | mg 146 |
| Riboflavin | mg 158 |
| Niacin | mg 1,464 |
| Pyridoxine hydrochloride | mg 146 |
| D-calcium panthothenate | mg 880 |
| Vitamin $B_{12}$, 3000 mmg./g. | mg 120 |
| Ferrous sulfate·$7H_2O$ | grams 14.6 |
| Potassium iodide | mg 48 |

It will be understood that it is intended to cover all changes and modifications of the examples of the invention herein chosen for the purpose of illustration which do not constitute departures from the spirit and scope of the invention.

I claim:
1. The process of making a hypoallergenic milk product which comprises heating a composition consisting essentially of substantially fat free milk including beta-lactoglobulin and casein in the proportions of about 1 part of the beta-lactoglobulin for 25–150 parts by weight of casein at a temperature of about 190°–212° F. and at an initial pH of approximately 6.2–6.8 for about 2.5–5 hours and until at least 90% of the said beta-lactoglobulin becomes precipitable along with the casein when the pH of the dispersion is lowered to 4.5, whereby the beta-lactoglobulin is converted to a form precipitable by human gastric juice.

2. The process of claim 1, the said milk being the product of reconstituting skim milk solids in water.

3. The process of claim 1 including sterilizing the product of said heating, while preventing reactivation of beta-lactoglobulin as an allergen, by subjecting the said product to further heating at a temperature not above about 310° F. and for only the shortest period of time that gives a sterilizing effect equivalent to $F_0=3-15$.

4. The process of making beta-lactoglobulin precipitable by the acidity of human gastric juice and reducing its allergenicity after ingestion which comprises heating a substantially fat free aqueous dispersion of the beta-lactoglobulin and casein in the proportions of about 1 part of the beta-lactoglobulin for 25–150 parts by weight of casein at a temperature of about 190°–212° F. and a pH of about 6.2–6.8 for about 2.5–5 hours at an initial pH of approximately 6.2–6.8 and until at least 90% of the said beta-lactoglobulin becomes precipitable along with the casein when the pH of the dispersion is lowered to 4.5.

References Cited in the file of this patent
UNITED STATES PATENTS
2,036,404    Frohring _____ Apr. 7, 1936

OTHER REFERENCES
Ramsdell et al.: J. Dairy Science, 1953, vol. 36, pp. 437–439.
Zittle et al.: J. Dairy Science, 1956, vol. 39, pp. 514–521.